(12) United States Patent
Gole et al.

(10) Patent No.: US 8,700,727 B1
(45) Date of Patent: Apr. 15, 2014

(54) PEER-TO-PEER BASED CACHING FOR NETWORK FILE SYSTEM

(75) Inventors: Abhijeet P. Gole, Cupertino, CA (US); Premkumar Mahadev Nikam, Sunnyvale, CA (US); Arvind Pruthi, Los Gatos, CA (US); Shekhar S. Deshkar, Pune (IN)

(73) Assignee: Toshiba Corporation, Tokyo (JP)

( * ) Notice: Subject to any disclaimer, the term of this patent is extended or adjusted under 35 U.S.C. 154(b) by 351 days.

(21) Appl. No.: 13/020,697

(22) Filed: Feb. 3, 2011

Related U.S. Application Data

(60) Provisional application No. 61/301,770, filed on Feb. 5, 2010.

(51) Int. Cl.
*G06F 15/167* (2006.01)
(52) U.S. Cl.
USPC ............................................ 709/213; 711/100
(58) Field of Classification Search
USPC .......................................................... 709/213
See application file for complete search history.

(56) References Cited

U.S. PATENT DOCUMENTS

| | | | |
|---|---|---|---|
| 7,194,532 B2 * | 3/2007 | Sazawa et al. ................. | 709/223 |
| 7,464,240 B2 * | 12/2008 | Caulkins et al. .............. | 711/165 |
| 7,617,322 B2 * | 11/2009 | Ahmed et al. ................. | 709/229 |
| 7,831,977 B2 * | 11/2010 | Shultz et al. .................. | 718/104 |
| 8,140,772 B1 * | 3/2012 | Yang .............................. | 711/141 |
| 2003/0182428 A1 * | 9/2003 | Li et al. ......................... | 709/227 |
| 2006/0120376 A1 * | 6/2006 | Duncan et al. ................ | 370/393 |
| 2006/0230111 A1 * | 10/2006 | Andersen et al. ............. | 709/205 |
| 2009/0077302 A1 * | 3/2009 | Fukuda ......................... | 711/103 |
| 2009/0271779 A1 * | 10/2009 | Clark ............................. | 717/171 |
| 2010/0094806 A1 * | 4/2010 | Apostolides et al. ......... | 707/637 |
| 2010/0106895 A1 * | 4/2010 | Condit et al. ................. | 711/103 |
| 2011/0145363 A1 * | 6/2011 | Ananthanarayanan et al. ............................ | 709/218 |

* cited by examiner

*Primary Examiner* — Tauqir Hussain
*Assistant Examiner* — Eyob Hagos
(74) *Attorney, Agent, or Firm* — White & Case LLP

(57) ABSTRACT

Systems and techniques relating to network file systems are described. A described technique includes associating with a process that exports a network file system, where the process manages the network file system, associating with one or more peers that use the network file system, where the one or more peers cache data associated with the network file system on one or more non-volatile memory structures, receiving a file system request to read or write at least a portion of a file that is associated with the network file system, and processing the file system request by selectively communicating with the one or more peers to retrieve cached data associated with the file when the file system request indicates a read or inform the one or more peers of a write to the file when the file system request indicates a write.

20 Claims, 8 Drawing Sheets

# PEER-TO-PEER BASED CACHING FOR NETWORK FILE SYSTEM

CROSS REFERENCE TO RELATED APPLICATION

This disclosure claims the benefit of the priority of U.S. Provisional Application Ser. No. 61/301,770, filed Feb. 5, 2010 and entitled "FLASH BASED CACHE FOR NFS (NETWORK FILE-SYSTEM)," which is incorporated herein by reference in its entirety.

BACKGROUND

The present disclosure describes systems and techniques relating to network file systems.

A server system can export one or more file systems over a network to client systems. Various examples of a server system include a Network Attached Storage (NAS) device and a server configured to run a file system daemon. A server system can include one or more data storage devices such as a hard disk drive (HDD) or a solid state drive (SSD). A server system can run a network file system (NFS) server daemon. A server running a NFS server daemon can be referred to as a NFS server. NFS servers are frequently used in data centers for data access and sharing data among clients.

Multiple client systems can mount a NFS exported by a NFS server. A client system can run a NFS client daemon to connect with one or more NFS servers to mount one or more NFSs. An operating system can provide access to local and network file systems to one or more applications such as a web server, e-mail server, database, or an operating system process. For example, an operating system can access one or more system files on a NFS. Typically, an application is agnostic regarding whether a file system is a network file system or a local file system.

A NFS server can support user authorization, authentication and prescribed security measures as required in enterprise data-centers. A NFS server can implement locking and cache coherency measures in conjunction with the NFS clients. NFS clients can cache file data and metadata locally to accelerate local application performance.

A server, such as a data processing apparatus that implements a virtualization layer, can run multiple operating system instances in separate virtual machines. Such instances can run NFS processes such as a NFS server daemon or a NFS client daemon. The server provides a virtualized network interface to each of the operating system instances such that the virtual machines communicate with each other as if they are actually on a physical network. For example, each virtual machine can have an assigned network address, e.g., Internet Protocol (IP) address.

SUMMARY

The present disclosure describes systems and techniques relating to network file systems.

According to an aspect of the present disclosure, a network file system based technique includes associating with a process that exports a network file system, where the process manages the network file system, associating with one or more peers that use the network file system, where the one or more peers cache data associated with the network file system on one or more non-volatile memory structures, receiving a file system request to read or write at least a portion of a file that is associated with the network file system, and processing the file system request by selectively communicating with the one or more peers to retrieve cached data associated with the file when the file system request indicates a read or inform the one or more peers of a write to the file when the file system request indicates a write.

Implementations can include one or more of the following features. A file system request can include a write request. Processing a file system request can include, receiving file data from an application for writing to the file, performing data de-duplication to invalidate one or more remotely cached versions of the files, caching the file data in a local non-volatile memory structure, and committing the file data to the network file system. A file system request can include a read request. Processing the file system request can include checking for the file in a local non-volatile memory structure, selectively identifying a peer of the one or more peers having a cached version of the file, selectively sending, based on a lack of the file in the local non-volatile memory structure, a request to the identified peer to retrieve at least a portion of a remotely cached version of the file, and selectively communicating, based on a lack of locally and remotely cached versions of the file, with a process exporting the network file system to retrieve at least a portion of the file. Processing the file system request can include caching the file on a local non-volatile memory structure and performing data de-duplication to invalidate one or more remotely cached versions of the files.

Implementations can include running virtual machines that include a first virtual machine and a second virtual machine. The first virtual machine can run a first peer process to access the network file system. The second virtual machine can run a second peer process to access the network file system. The first peer process and second peer process can cache data associated with the network file system on the one or more non-volatile memory structures. The first peer process can cache a first version of the file on the one or more non-volatile memory structures. The second peer process can cache a second version of the file on the one or more non-volatile memory structures and causes the first peer process to invalidate the first version.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiments can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a smart phone, a personal digital assistant (PDA), a mobile computer, a digital camera), a general purpose data processing apparatus such as a computer, or combinations of these.

Systems and apparatus can include a server system running a process that exports a network file system, where the process manages the network file system; a non-volatile memory structure to cache data associated with the network file system; and processor electronics. Processor electronics can be configured to associate with the network file system, associate with one or more peers that are configured to cache data associated with the network file system, the one or more peers having respective one or more connections with the network file system, receive a file system request to read or write at least a portion of a file that is associated with the network file system, and process the file system request by selectively communicating with the one or more peers to retrieve cached data associated with the file when the file system request indicates a read or inform the one or more peers of a write to the file when the file system request indicates a write.

Systems and apparatus can include a non-volatile memory structure to cache data associated with a network file system and processor electronics. Processor electronics can be configured to associate with the network file system, associate with one or more peers that are configured to cache data associated with the network file system, the one or more peers having respective one or more connections with the network file system, receive a file system request to read or write at least a portion of a file that is associated with the network file system, and process the file system request by selectively communicating with the one or more peers to retrieve cached data associated with the file, when the file system request indicates a read or inform the one or more peers of a write to the file, when the file system request indicates a write.

In some implementations, processor electronics are configured to receive file data from an application for writing to the file, perform data de-duplication to invalidate one or more remotely cached versions of the files, cache the file data in the non-volatile memory structure, and commit the file data to the network file system. In some implementations, processor electronics are configured to check for the file in the non-volatile memory structure, selectively identify a peer of the one or more peers having a cached version of the file, selectively send, based on a lack of the file in the non-volatile memory structure, a request to the identified peer to retrieve at least a portion of a remotely cached version of the file, and selectively communicate, based on a lack of locally and remotely cached versions of the file, with a process exporting the network file system to retrieve at least a portion of the file. In some implementations, processor electronics are configured to cache the file on the non-volatile memory structure, and perform data de-duplication to invalidate one or more remotely cached versions of the files. Implementations can include a solid state drive that includes a non-volatile memory structure. A non-volatile memory structure can include a flash memory structure.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

Figure 1:
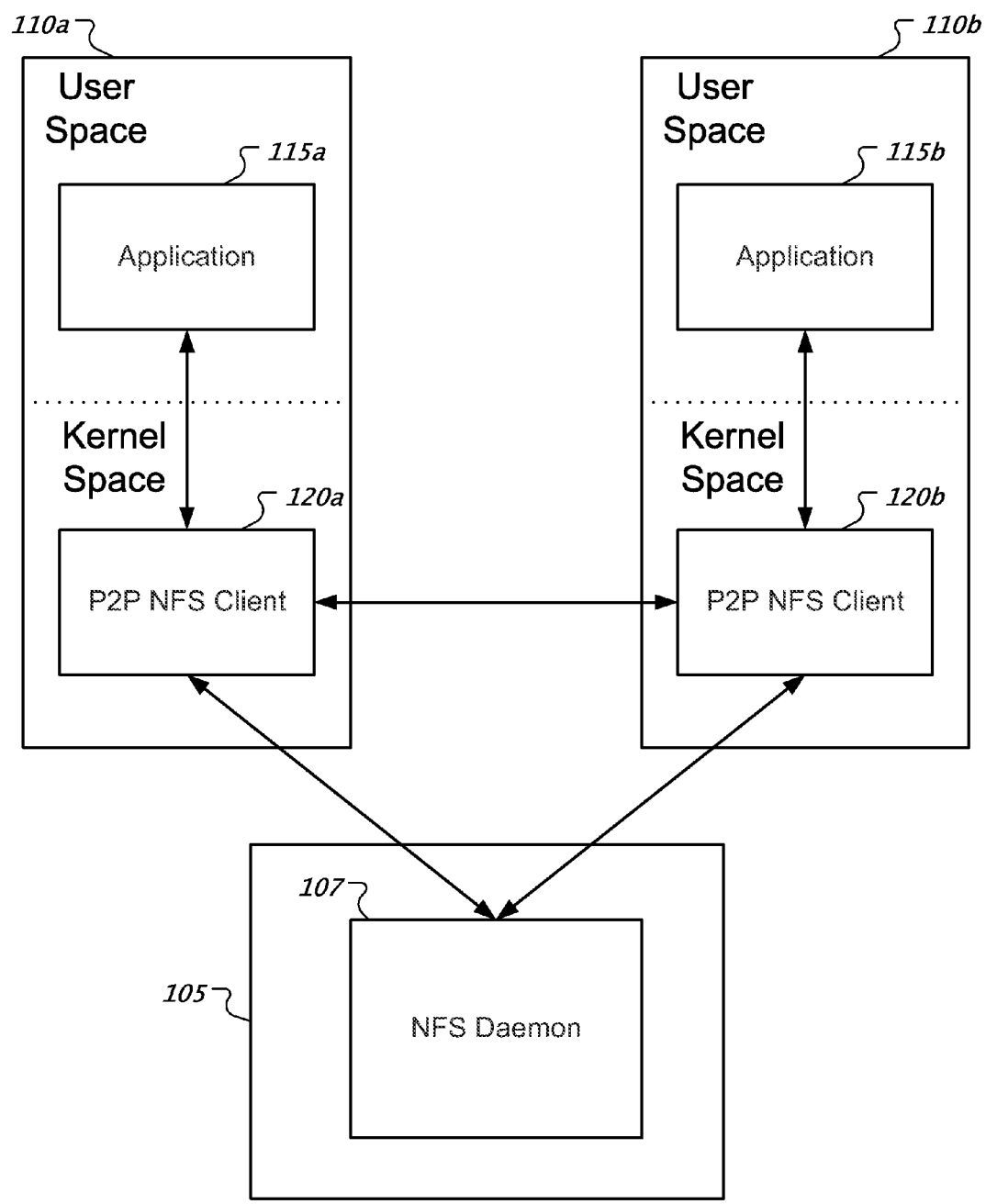
FIG. 1 shows an example of a network file system architecture with peer-to-peer network file system clients.

Network File System (NFS) servers and clients exchange file data. A NFS client can use locally cached file data to increase file system performance, e.g., reduce NFS server workload, decrease access time latency, or both. This disclosure describes systems and techniques to leverage local caches of NFS clients to increase file system performance. As disclosed herein, a technique includes providing a peer-to-peer (P2P) layer for NFS clients. For example, P2P based NFS clients can communicate with each other to exchange file data, e.g., retrieve or distribute cached file data.

P2P NFS clients can use a solid state device (SSD) to provide a persistent cache for file operations. A SSD can include non-volatile memory such as flash memory. Flash memory is a type of computer memory that can be electronically erased and reprogrammed. NAND flash memory based SSDs can persistently store large amounts of data at costs lower than some other memory devices and at speeds greater than that of magnetic disk devices. Further, NAND flash memory based SSD can provide high speed random access at low costs. For example, a P2P NFS client can use a NAND based SSD to provide a flash based caching system to accelerate networked file system accesses in various environments such as ones with network attached storage (NAS) devices.

A NFS server can perform user authorization, authentication, and provide mechanisms for locking and cache coherency to NFS clients. NFS clients can cache file data and metadata locally to accelerate local application performance. However, in some cases, cached metadata are compulsorily retired from local cache at periodic intervals, such as every 30 seconds. While compulsorily retirement can be desirable for cache coherency in a distributed setup, compulsorily retirement may unnecessarily invalidate locally cached copies if the related file objects are not being actively accessed or modified by another client(s). Further, NFS clients without dedicated persistent memory areas can be required to use main memory, as provided by the operating system, to cache file data. However, memory demand from other entities (e.g., application memory usage, heap usage, or memory mapped regions) may limit the amount of space in the main memory for a NFS client to cache data. Moreover, main memory can be implemented with volatile memory and, therefore, does not generally provide persistent data storage. In contrast, a P2P NFS client can use non-volatile memory to persistently cache file data.

Storage architectures can use P2P NFS clients that intelligently share and cache data to increase performance of file systems exported by storage servers such as a NAS device. These clients can provide increased file system performance to the applications running on the host via caching of data on a local flash based device. These clients can provide increased metadata performance to the applications via caching of metadata on a local flash based device. These clients can provide transparent file system access to applications without requiring application-level changes. These clients can decrease NFS server workload without requiring the NFS server to be aware of the P2P layer. Two or more of these clients can run concurrently in a virtual server environment, e.g., running in separate virtual machines, to provide increased file system performance to applications running in the virtual server environment. A virtual server controller can use a SSD to provide persistent caches to clients running in respective virtual machines. Clients can coordinate with each other by implementing a peer-to-peer protocol to implement a coherent distributed cache for application data. Clients can use one or more data de-duplication techniques to remove cached file versions to optimize space on local caches.

FIG. 1 shows an example of a NFS architecture with P2P NFS clients. A NAS device 105 can be a computer, connected to a network, that provides file-based data storage services. A NAS device 105 can be a central point of management for a file system that is accessible via the network. A NAS device 105 can run a NFS daemon 107 that exports one or more file systems. An exported file system can be referred to as a network file system.

A NAS device 105 can communicate with client devices 110a, 110b that run NFS clients such as peer-to-peer (P2P) NFS clients 120a, 120b. P2P NFS clients 120a, 120b can be referred to as peers. The P2P NFS clients 120a, 120b, running in kernel space, can mount one or more network file systems that are exported by the NFS daemon 107. Applications 115a, 115b, running in user space, can generate read and write requests for files. For files associated with a network file system, a P2P NFS client 120a, 120b can service the request.

Typically, a NFS client communicates with a NFS daemon 107 to handle NFS based requests, unless a request can be serviced locally, e.g., using a cached version. A P2P NFS client 120a, 120b can communicate with another P2P NFS client 120a, 120b to attempt to handle file system requests that cannot be serviced locally. If no other P2P NFS client 120a, 120b is able to provide a cached version of a file for a read access, then a client can communicate with the NFS daemon 107 to retrieve the file. In this way, an addition of a P2P communication layer can reduce load on the NFS daemon 107.

Figure 2:
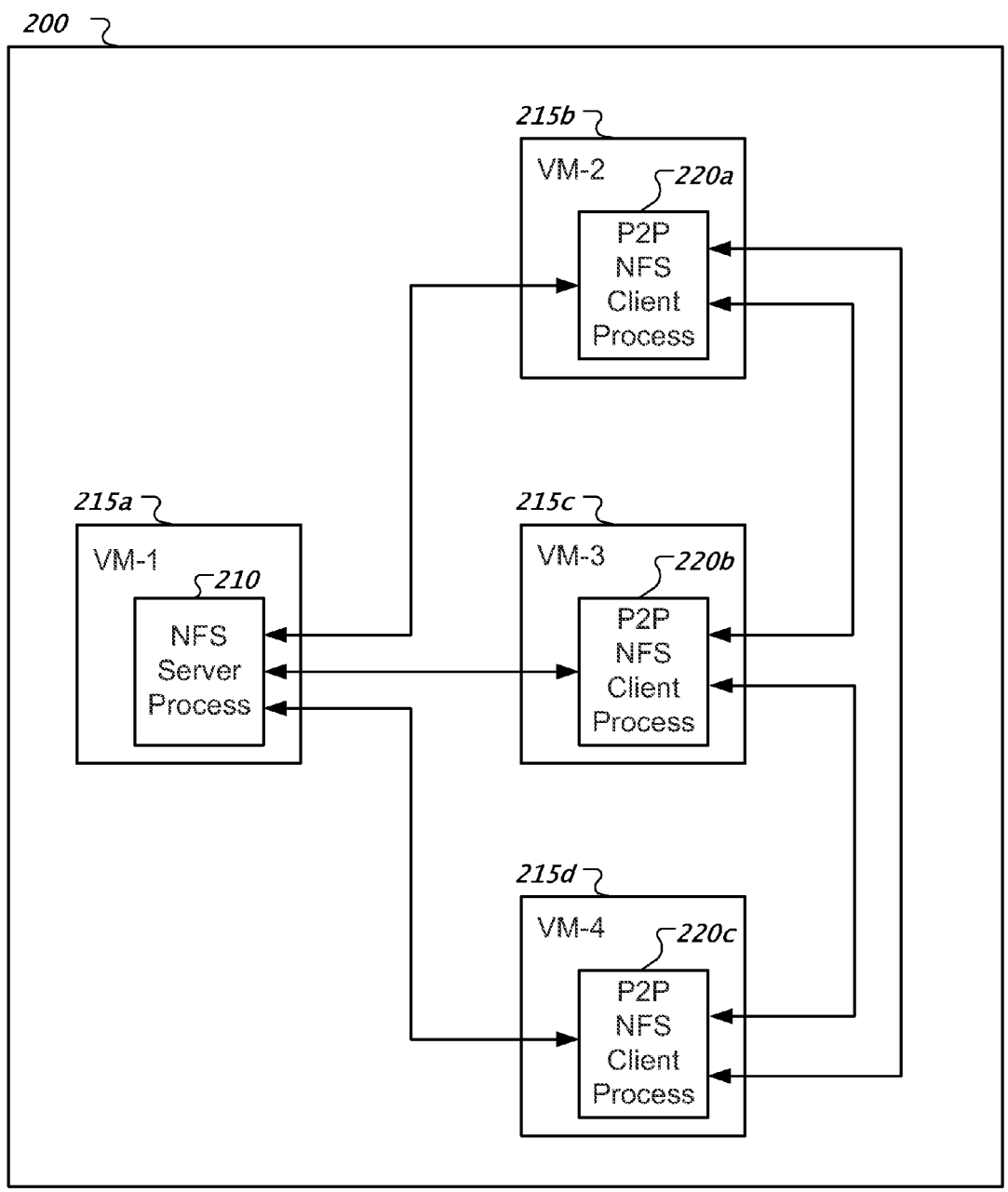
FIG. 2 shows an example of communication pathways between network file system elements running on virtual machines.

FIG. 2 shows an example of communication pathways between NFS elements running on virtual machines. A server 200 can run multiple virtual machines (VMs) 215a, 215b, 215c, 215d. A virtual machine 215a can run a NFS server process 210 that exports one or more file systems to other virtual machines 215b-d running NFS client processes such as P2P NFS client processes 220a, 220b, 220c. The P2P NFS client processes 220a-c can communicate with each other via communication pathways provided by the server 200.

In some implementations, the server 200 includes multiple processors to concurrently run multiple virtual machines. The virtual machines 215a-d run respective instances of an operating system. In some implementations, a server 200 can host two or more types of operating systems. The server 200 provides communication pathways between the virtual machines 215a-d. In some implementations, communication pathways are communication channels provided by a virtualization layer running on the server 200. The virtualization layer can be responsible for managing the virtual machines 215a-d. In some implementations, a virtualization layer running on the server 200 can configure the virtual machines 215a-d to be individual nodes on a network. For example, the server 200 can provide unique network addresses to the virtual machines 215a-d for Internet Protocol (IP) based communications.

Figure 3:
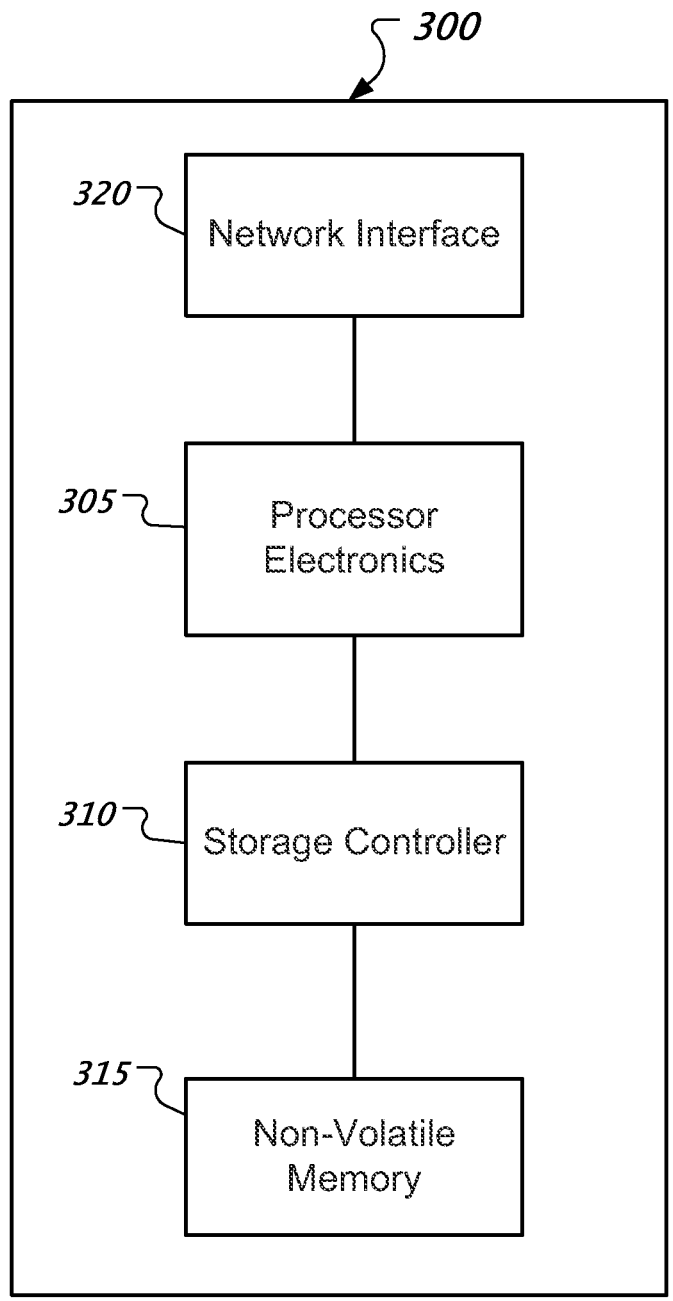
FIG. 3 shows an example of a device operable to run a peer-to-peer network file system client.

FIG. 3 shows an example of a device operable to run a peer-to-peer network file system client. A device 300 can run a P2P NFS client. The device 300 can include processor electronics 305, a storage controller 310, non-volatile memory 315, and a network interface 320. Processor electronics 305 can include one or more processors to run a P2P NFS client as described herein. The P2P NFS client can communicate with network nodes such as a NFS server process or peers via the network interface 320. The P2P NFS client can cache data in the non-volatile memory 315 by sending commands to the storage controller 310. In some implementations, processor electronics 305 communicate with the storage controller 310 via an interface such as a Peripheral Component Interconnect (PCI), Serial Advanced Technology Attachment (SATA), Small Computer System Interface (SCSI), Serial Attached SCSI (SAS), Ethernet, or Universal Serial Bus (USB).

A device 300 can include one or more processors, memory, and input/output (I/O) connections. In some implementations, a device 300 includes a system-on-a-chip (SOC) that contains processor electronics 305, a storage controller 310, and non-volatile memory 315, and a network interface 320. For example, a SOC can include a general purpose processor and one or more controllers to access external devices such as hard disk drives (HDDs) or solid-state drives (SSDs). A SSD can include one or more non-volatile memory structures such as a non-volatile memory integrated circuit, e.g., flash chip.

Figure 4:
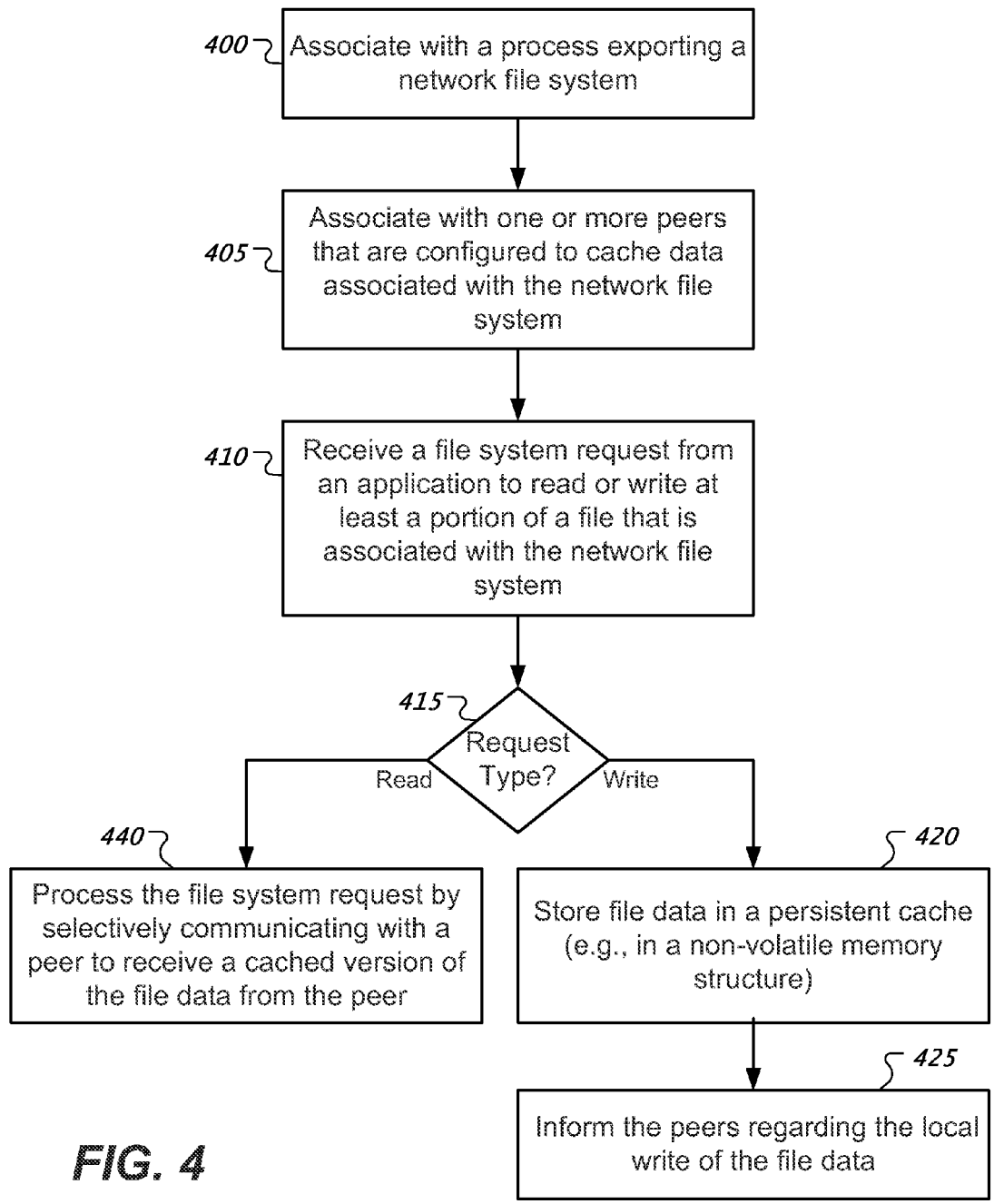
FIG. 4 shows an example of a peer-to-peer network file system client process.

FIG. 4 shows an example of a P2P NFS client process. A P2P NFS client can use P2P communications to exchange NFS related file data. At 400, a P2P NFS client process associates with a process exporting a network file system. Associating a process exporting a network file system can include connecting with the process by sending and receiving packets such as Transmission Control Protocol (TCP) based packets or User Datagram Protocol (UDP) based packets. In some implementations, associating with a process exporting a network file system includes communicating with a server running the process. In some implementations, associating with a process exporting a network file system includes communicating with a virtual machine running the process. A process exporting a network file system can provide centralized management for the network file system.

At 405, the P2P NFS client process associates with one or more peers that are configured to cache data associated with the network file system. For example, a group of P2P NFS clients can connect with each other to share cached NFS data. A P2P NFS client can be referred to as a peer. Connecting with one or more peers can include joining a communication group, e.g., a multicast group, to send and receive data.

At 410, the P2P NFS client process receives a file system request from an application to read or write at least a portion of a file that is associated with the network file system. Various examples of a file system request include a write request, a read request, and a file create request. Receiving a file system request can include receiving a file create request and a write request. In some implementations, a file system request includes a file descriptor associated with the file. In some implementations, a file system request includes a path and file name.

At 415, the P2P NFS client process determines a type of the request. If the request is a write, then the process, at 420, stores file data in a persistent cache. Storing file data in a persistent cache can include storing file data in a non-volatile memory structure. At 425, the process can inform the peers regarding the local write of the file data. If the request is a read, then the process, at 440, processes the file system request by selectively communicating with a peer to receive a cached version of the file data from the peer. If there is a locally cached version of the file, the process is not required to communicate with a peer. In some implementations, the process uses a lookup table that associates names of files with names of peers that have cached versions of the files. If the lookup table does include an entry for a file, then the process can communicate with one or more peers indicated by the entry to receive a remotely cached version. If the file is not cached by any of the peers, the process can communicate with the NFS process to receive the file.

Figure 5:
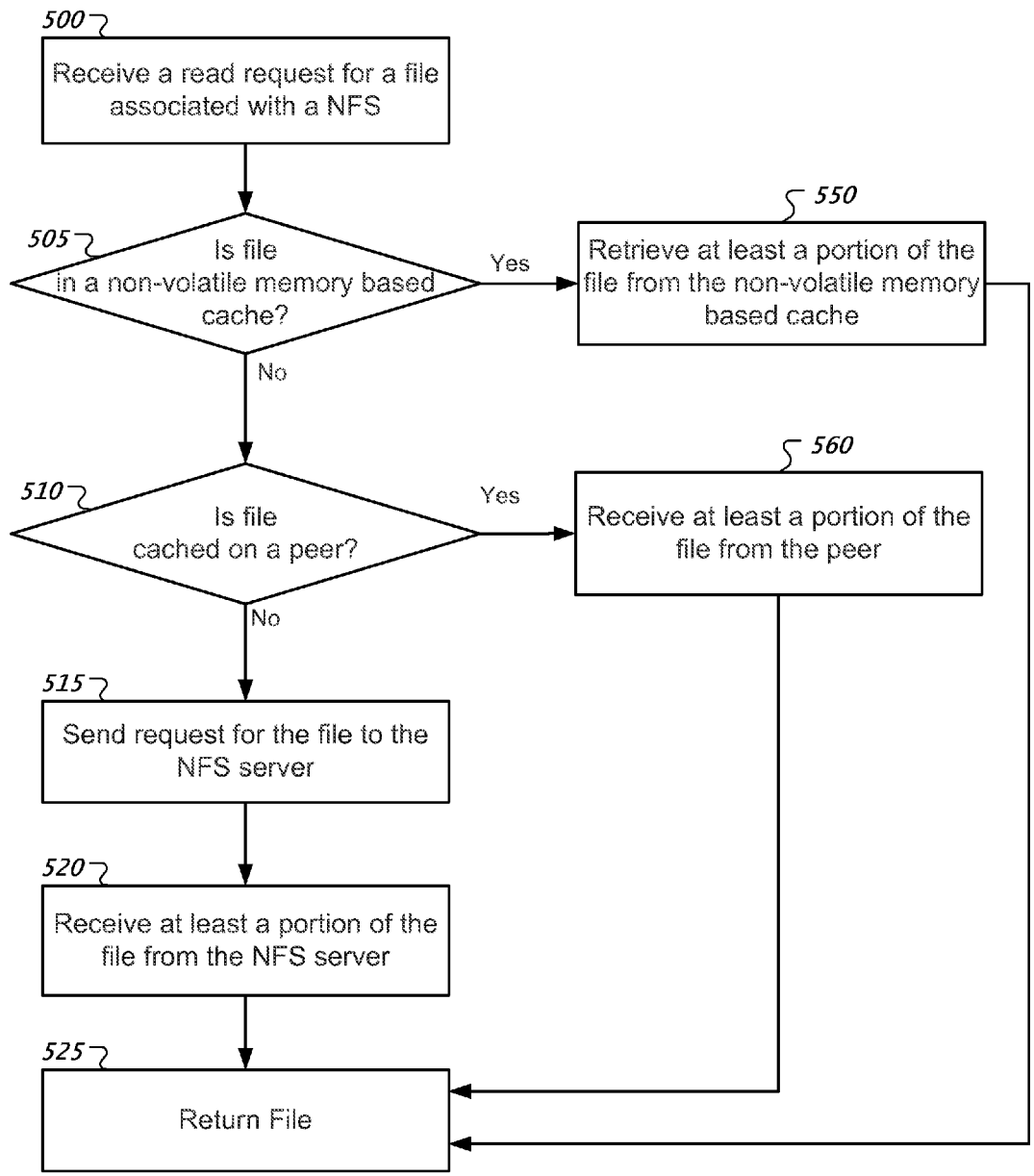
FIG. 5 shows an example of a peer-to-peer network file system based read process.

FIG. 5 shows an example of a P2P NFS based read process. At 500, a P2P NFS based read process receives a read request for a file associated with a NFS. In some implementations, an operating system, based on determining that a file is associated with a NFS, calls the process on behalf of an application's read request. At 505, the process determines whether the requested file is in a non-volatile memory based cache. If the requested file is in the cache, then, the process, at 550, retrieves at least a portion of the file from the non-volatile memory based cache. In some implementations, a file is stored as one or more pages (e.g., storage units of 1,024 bytes, 2,048 bytes, or 4,096 bytes). Pages can be individually addressable and retrievable. At 525, the process returns the file. Returning the file can include returning a pointer to the file. In some implementations, returning the file can include setting an internal data reference for reading the file at a specific location such as a beginning location or a location indicated by the read request. Returning the file can include loading a portion of the file to a random access memory (RAM) for consumption by an application process.

If the file is not in the cache, then the P2P NFS based read process, at 510, determines whether the file is cached on a peer. Determining whether the file is cached on a peer can include generating a message that requests a remotely cached version of the file. The process can send the message to one or more target peers. The process can select target peers based on a list of peers. In some implementations, the process selects target peers based on a list of peers that are caching the file. If the file is cached on a peer, then, the process, at 560, retrieves at least a portion of the file from the peer. Retrieving at least a portion of the file can include receiving one or more pages of a file. At 525, the process returns the file. If the file is not cached on a peer, then the process, at 515, sends a request for the file to the NFS server. At 520, the process receives at least a portion of the file from the NFS server. At 525, the process returns the file.

Figure 6:
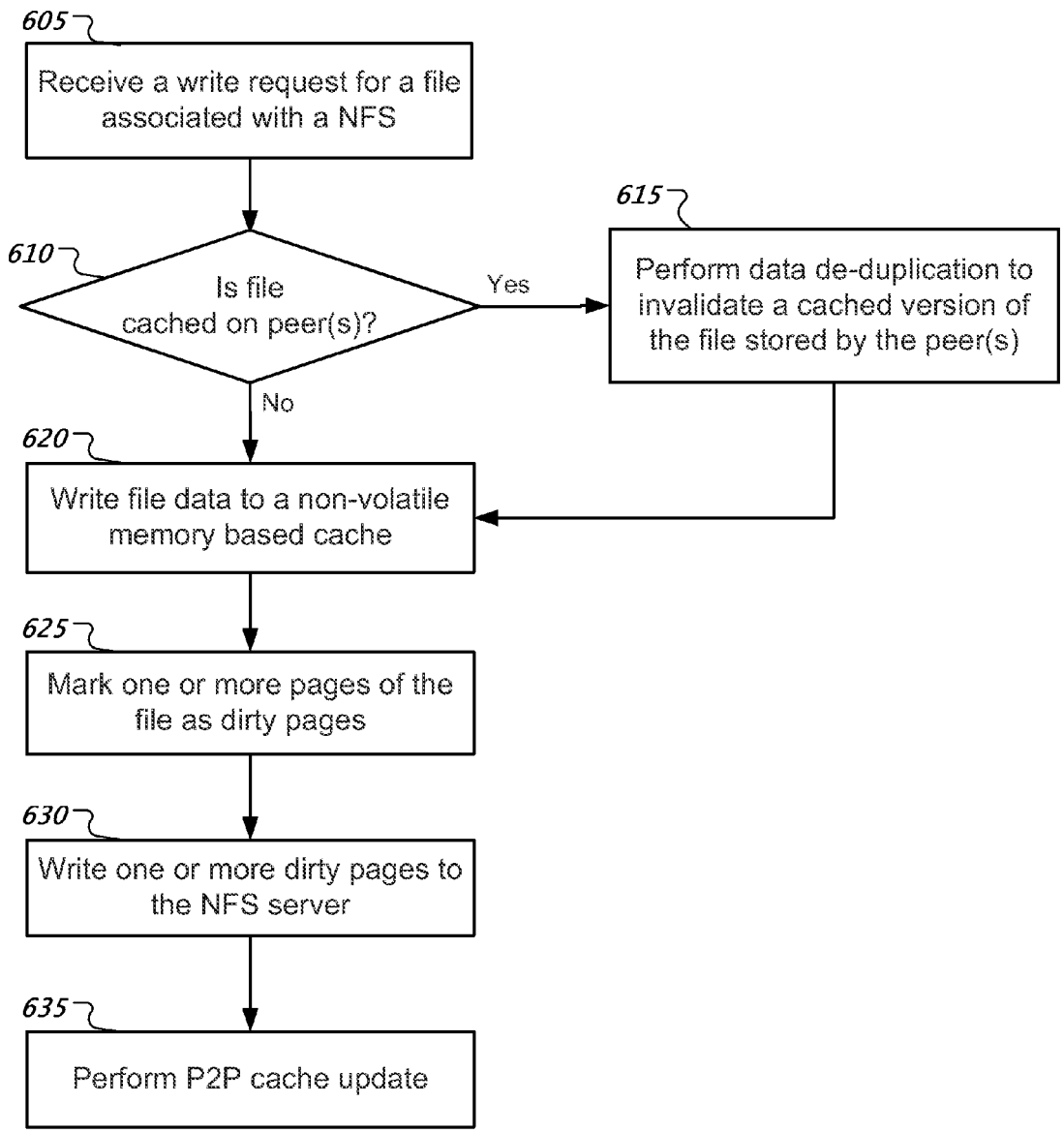
FIG. 6 shows an example of a peer-to-peer network file system based write process.

FIG. 6 shows an example of a P2P NFS based write process. At 605, a P2P NFS based write process receives a write request for a file associated with a NFS. At 610, the process determines if the requested file is cached on one or more peers. If the file is cached on a peer, then the process, at 615, performs data de-duplication to invalidate a cached version of the file stored by the peer. Performing data de-duplication can include sending a message to one or more peers. The message can include a file identifier and an invalidation request.

At 620, the P2P NFS based write process writes file data to a non-volatile memory based cache. Writing file data to the cache can include writing at least a portion of a page to the cache. In some implementations, the write request includes a pointer to file data. For example, the process can use the pointer to copy file data to the cache.

Writing file data to the cache without writing the file data to the NFS server can cause one or more affected pages of the file to be dirty pages. At 625, the P2P NFS based write process can mark one or more pages of the file as dirty pages. Marking pages as dirty can include setting a dirty bit field. At 630, the process can write one or more dirty pages to the NFS server.

In some implementations, the process aggregates multiple dirty pages into a single write to a NFS server. For example, an application can perform separate writes to a file over a period of time. Aggregating writes to the NFS server can reduce the server's workload.

At 635, the P2P NFS based write process performs a P2P cache update. In some implementations, performing a P2P cache update includes sending a notification of a write to a file to one or more peers. A notification can include file data. In some implementations, performing a P2P cache update includes publishing a notification of a write to a file via a publisher/subscriber communication framework.

Figure 7:
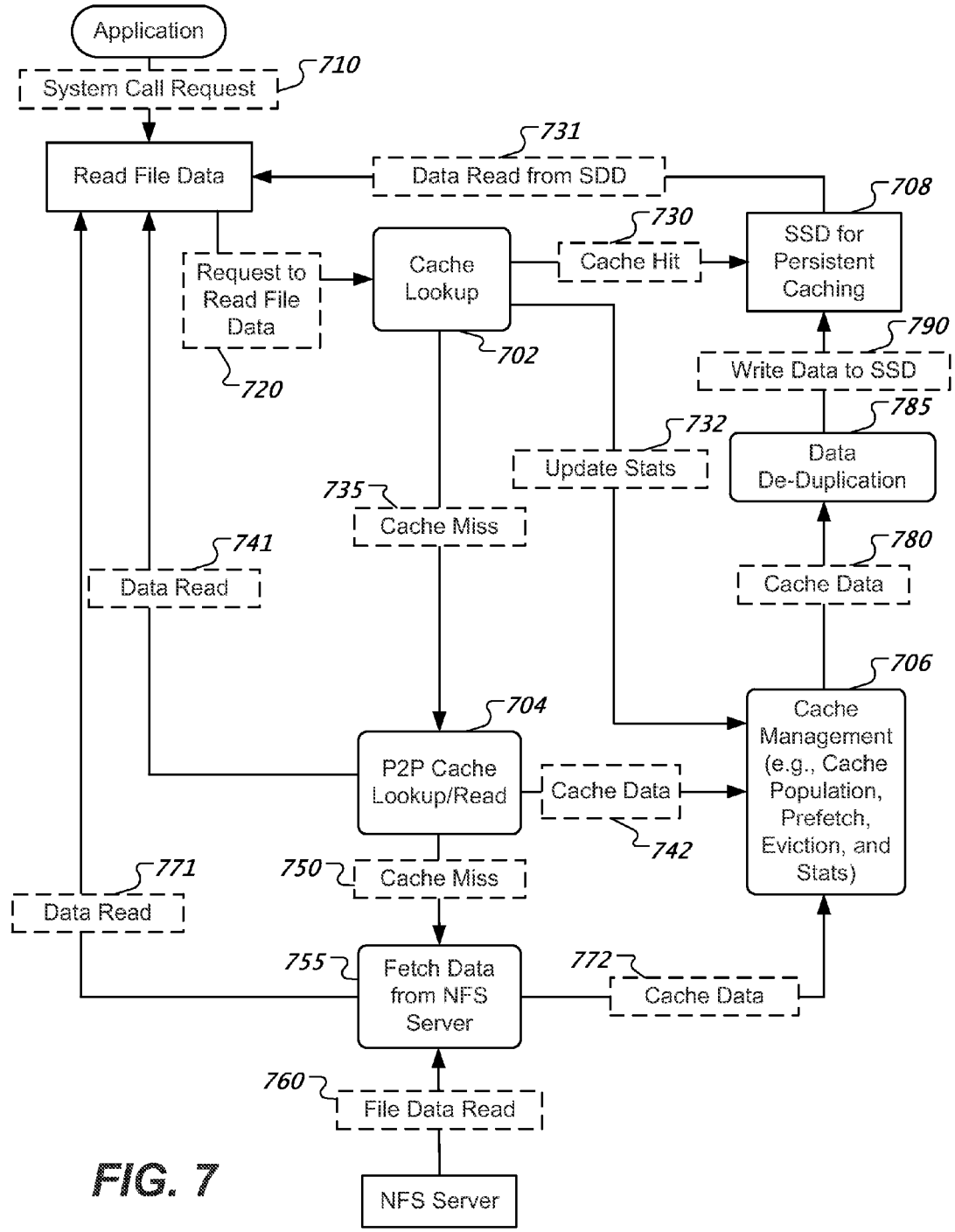
FIG. 7 shows an example of a data-flow associated with a read process.

FIG. 7 shows an example of a data-flow associated with a read process. A P2P NFS client can include a cache lookup module 702 configured to use a P2P cache lookup and read module 704 to access other P2P NFS clients for retrieving cached files. The client can retrieve a cached file from one or more non-volatile memory structures such as a SSD 708. The cache lookup module 702 can communicate with a local cache management module 706, which can perform operations including cache population, cache prefetching, cache eviction, and maintaining cache statistics.

At 710, an application can issue a system call request to read a file. An operating system can process the request. If the file is associated with a NFS, the operating system, at 720, can send a request to read file data to the P2P NFS client. The client can operate the cache lookup module 702 to determine a cache status of the file.

If there is a local cache hit, at 730, the client reads cached file data from the SSD 708. At 731, the client returns cached file data to the operating system, which will forward the file data to the application. At 732, the client causes the local cache management module 706 to update cache statistics.

If there is a local cache miss, at 735, the client can cause a P2P cache lookup and read module 704 to process the request. The P2P cache lookup and read module 704 can generate remote cached file entries in a data structure based on received messages from other P2P NFS clients regarding their locally cached files. The P2P cache lookup and read module 704 can search the data structure based on the file identified by the request. Based on a matching remote cached file entry, the client can send a message to the peer associated with the matching entry to obtain the cached file. The peer can send one or more messages with the cached file data. The client can receive the cached file data from the peer. Based on successfully receiving remotely cached file data, the client, at 741, can return the file data to the application. At 742, the client can cause the local cache management module 706 to cache the file data in a local cache such as SSD 708.

If there is a remote cache miss, at 750, the client, at 755, can fetch file data from a NFS server. At 760, the client can receive file data from the NFS server. At 771, the client can return the file data to the application. At 772, the client can cache the file data in a local cache such as SSD 708. In some cases, an application may send a request with a malformed or nonexistent file name or path. In such a case, the NFS server can send a message that indicates an error instead of a message that includes file data.

The client, at 780, via the local cache management module 706 can cache file data received from sources such as a peer or a NFS server. The client can cause a data de-duplication module 785 to remove cached versions of the file from other clients. In some implementations, the data de-duplication module 785 sends a request that identifies one or more pages of the file that are to be removed from a cache. At 790, the client can write file data to the SSD 708 for persistent caching of the file data.

Figure 8:
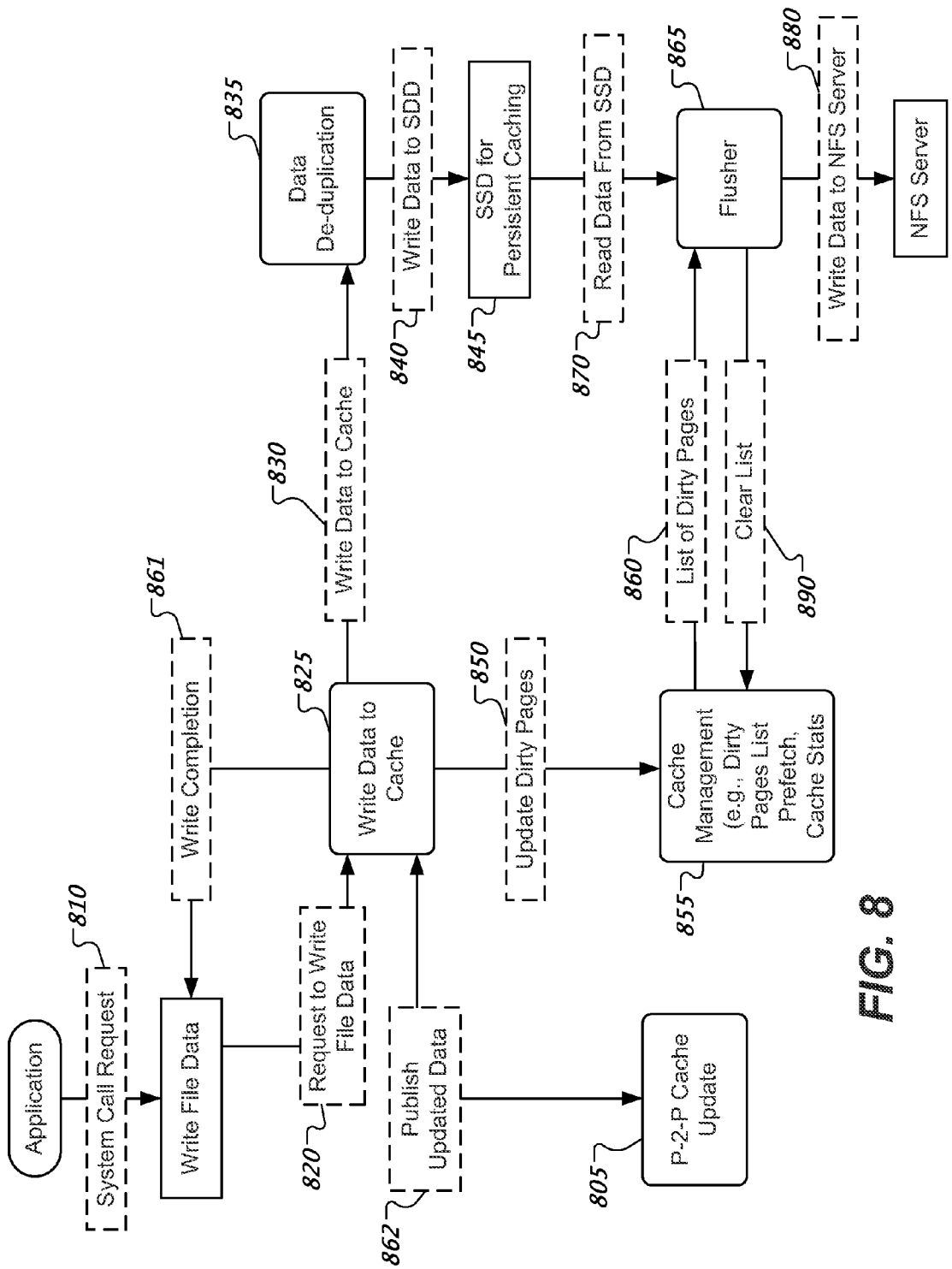
FIG. 8 shows an example of a data-flow associated with a write process.

FIG. 8 shows an example of a data-flow associated with a write process. A P2P NFS client can include a P2P cache update module 805 to update one or more peer clients of a local write. The module 805 can maintain a list of peers that are caching a file. Based on a local write to the file, the module 805 can send messages to the peers to invalidate cached versions of the file. In some implementations, the module 805 broadcasts a message to invalidate the cached versions of the file. In some implementations, peers can form a multicast group. The module 805 can send a multicast message to the group to invalidate cached versions of the file.

At 810, an operating system can receive a system call request from an application to write data to a file. The operating system can process the request. If the file is associated with a NFS, the operating system, at 820, can send a request to write file data to the P2P NFS client. Based on detecting the write request, the client can cause a write cache module 825 to process the write. The write cache module 825, at 830, can write data to cache. At 835, the write cache module 825 can perform data de-duplication based on the write request. Performing data de-duplication can include sending a message that includes a file identifier and a request identifier to purge the corresponding file from a cache. At 840, the write cache module 825 can write file data to a SSD 845.

At 850, the write cache module 825 can cause a cache management module 855 to update one or more dirty pages associated with the file identified by the write request. The cache management module 855 can perform operations such as managing a dirty page list, cache prefetching, and maintaining cache statistics. A page can be deemed dirty when a page requires a write to a NFS.

In some implementations, a write is completed once the client successfully causes a write of file data to a local persistent cache such as a SSD 845. Hence, a write can complete from an application standpoint while still having one or more associated dirty pages. In case of a failure event such as a loss of power or communication, the client can use a dirty page list to search for file data in the SSD 845 that have not been written to the NFS server and write such file data to the NFS server.

At 861, the client via the write cache module 825 can send a write completion notification to the operating system, which, in turns notifies the application. In some implementations, the notifications occur concurrently with the client performing additional file system operations such as causing the cache management module 855 to process dirty pages.

At 860, the cache management module 855 sends a list of one or more dirty pages to a flusher module 865. At 870, the flusher module 865 communicates to a NFS server to commit file writes to the NFS. The flusher module 865 can read file data from the SSD 845 to verify a successful write of file data. Based on a successful write, the flusher module 865, at 880, can write file data to the NFS server. The NFS server can send a message to indicate a successful commit of file data. Based on receive such a message, the flusher module 865 can clear one or more dirty pages. Based on the clearing, the flusher module 865 can, at 890, send a clear list to the cache management module 855. The cache management module 855 can update cache management records based on the clear list.

At 862, the write cache module 825 can cause the P2P cache update module 805 to publish updated file data to one or more peers. Publishing updated file data can include sending a list of one or pages of a file that have been write to via the write request. Publishing updated file data can include sending a message to invalidate an entire cached file. Publishing updated file data can include sending one or more portions of a file affected by the write request. In some implementations, the write request includes a file creation request. Publishing updated file data can include sending a notification of a new file within the NFS.

A P2P NFS client can run a module that is based on a combination of two or more modules described herein. Other implementations are possible. Moreover, other arrangements of the described modules are possible.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A system comprising:
a server system running a process that exports a network file system, wherein the process manages the network file system; and
a device that is communicatively coupled with the server system via a network, the device comprising: (i) a non-volatile memory structure to cache data associated with the network file system, and (ii) processor electronics configured to
associate with the network file system,
associate with one or more peers that are configured to cache data associated with the network file system, the one or more peers having respective one or more connections with the network file system,
receive a file system request to read or write at least a portion of a file that is associated with the network file system,
selectively communicate with the one or more peers to retrieve cached data associated with the file when the file system request indicates a read, and
perform a write file operation when the file system request indicates a write, the write file operation to receive file data from an application for writing to the file, selectively communicate with the one or more peers to inform the one or more peers of a write to the file, selectively perform data de-duplication to invalidate any remotely cached versions of the file that are cached by the one or more peers, and cache the file data in the non-volatile memory structure,
wherein the processor electronics are configured to commit the file data to the network file system.

2. The system of claim 1, wherein the file system request comprises a write request, and wherein the processor electronics are configured to
commit the file data in aggregate with additional file data to the network file system after the write file operation is successfully completed, the additional file data being associated with an additional write file operation.

3. The system of claim 1, wherein the file system request comprises a read request, and wherein the processor electronics are configured to
check for the file in the non-volatile memory structure,
selectively identify a peer of the one or more peers having a cached version of the file,
selectively send, based on a lack of the file in the non-volatile memory structure, a request to the identified peer to retrieve at least a portion of a remotely cached version of the file, and
selectively communicate, based on a lack of locally and remotely cached versions of the file, with a process exporting the network file system to retrieve at least a portion of the file.

4. The system of claim 1, wherein the processor electronics are configured to
cache the file on the non-volatile memory structure, and
perform data de-duplication to invalidate one or more remotely cached versions of the file.

5. The system of claim 1, wherein the processor electronics are configured to run virtual machines that comprise a first virtual machine and a second virtual machine, wherein the first virtual machine runs a first peer process to access the network file system, wherein the second virtual machine runs a second peer process to access the network file system, and wherein the first peer process and second peer process cache data associated with the network file system on the non-volatile memory structure.

6. The system of claim 5, wherein the first peer process caches a first version of the file on the non-volatile memory structure, wherein the second peer process caches a second version of the file on the non-volatile memory structure and causes the first peer process to invalidate the first version.

7. The system of claim 1, wherein the device comprises a solid state drive that comprises the non-volatile memory structure, wherein the non-volatile memory structure comprises a flash memory structure.

8. An apparatus comprising:
a non-volatile memory structure to cache data associated with a network file system; and
processor electronics configured to
associate with the network file system,
associate with one or more peers that are configured to cache data associated with the network file system, the one or more peers having respective one or more connections with the network file system,
receive a file system request to read or write at least a portion of a file that is associated with the network file system,
selectively communicate with the one or more peers to retrieve cached data associated with the file, when the file system request indicates a read, and
perform a write file operation when the file system request indicates a write, the write file operation to receive file data from an application for writing to the file, selectively communicate with the one or more peers to inform the one or more peers of a write to the file, selectively perform data de-duplication to invalidate any remotely cached versions of the file that are cached by the one or more peers, and cache the file data in the non-volatile memory structure,
wherein the processor electronics are configured to commit the file data to the network file system.

9. The apparatus of claim 8, wherein the file system request comprises a write request, and wherein the processor electronics are configured to
commit the file data in aggregate with additional file data to the network file system after the write file operation is successfully completed, the additional file data being associated with an additional write file operation.

10. The apparatus of claim 8, wherein the file system request comprises a read request, and wherein the processor electronics are configured to
check for the file in the non-volatile memory structure,
selectively identify a peer of the one or more peers having a cached version of the file,
selectively send, based on a lack of the file in the non-volatile memory structure, a request to the identified peer to retrieve at least a portion of a remotely cached version of the file, and
selectively communicate, based on a lack of locally and remotely cached versions of the file, with a process exporting the network file system to retrieve at least a portion of the file.

11. The apparatus of claim 8, wherein the processor electronics are configured to
cache the file on the non-volatile memory structure, and
perform data de-duplication to invalidate one or more remotely cached versions of the file.

12. The apparatus of claim 8, wherein the processor electronics are configured to run virtual machines that comprise a first virtual machine and a second virtual machine, wherein the first virtual machine runs a first peer process to access the network file system, wherein the second virtual machine runs a second peer process to access the network file system, and wherein the first peer process and second peer process cache data associated with the network file system on the non-volatile memory structure.

13. The apparatus of claim 12, wherein the first peer process caches a first version of the file on the non-volatile memory structure, wherein the second peer process caches a second version of the file on the non-volatile memory structure and causes the first peer process to invalidate the first version.

14. The apparatus of claim 8, comprising:
a solid state drive that comprises the non-volatile memory structure, wherein the non-volatile memory structure comprises a flash memory structure.

15. A method comprising:
associating with a process that exports a network file system, wherein the process manages the network file system;
associating with one or more peers that use the network file system, wherein the one or more peers cache data associated with the network file system on one or more non-volatile memory structures;
receiving a file system request to read or write at least a portion of a file that is associated with the network file system; and
processing the file system request by selectively communicating with the one or more peers to retrieve cached data associated with the file when the file system request indicates a read and performing a write file operation when the file system request indicates a write, the write file operation comprising: receiving file data from an application for writing to the file, selectively informing the one or more peers of a write to the file, selectively performing data de-duplication to invalidate any remotely cached versions of the file that are cached by the one or more peers, and caching the file data in a local non-volatile memory structure, wherein processing the file system request comprises committing the file data to the network file system.

16. The method of claim 15, wherein the file system request comprises a write request, and wherein
the file data is committed in aggregate with additional file data to the network file system after the write file operation is successfully completed, the additional file data being associated with an additional write file operation.

17. The method of claim 15, wherein the file system request comprises a read request, and wherein processing the file system request comprises:
checking for the file in the local non-volatile memory structure;
selectively identifying a peer of the one or more peers having a cached version of the file;
selectively sending, based on a lack of the file in the local non-volatile memory structure, a request to the identified peer to retrieve at least a portion of a remotely cached version of the file; and
selectively communicating, based on a lack of locally and remotely cached versions of the file, with a process exporting the network file system to retrieve at least a portion of the file.

18. The method of claim 15, wherein processing the file system request comprises:
caching the file on the local non-volatile memory structure; and
performing data de-duplication to invalidate one or more remotely cached versions of the file.

19. The method of claim 15, comprising:
running virtual machines that comprise a first virtual machine and a second virtual machine, wherein the first virtual machine runs a first peer process to access the network file system, wherein the second virtual machine runs a second peer process to access the network file system, and wherein the first peer process and second peer process cache data associated with the network file system on the one or more non-volatile memory structures.

20. The method of claim 19, wherein the first peer process caches a first version of the file on the one or more non-volatile memory structures, wherein the second peer process caches a second version of the file on the one or more non-volatile memory structures and causes the first peer process to invalidate the first version.

* * * * *